J. A. OLINGER.
RESILIENT TIRE.
APPLICATION FILED OCT. 10, 1916.
1,242,846.
Patented Oct. 9, 1917.
2 SHEETS—SHEET 2.
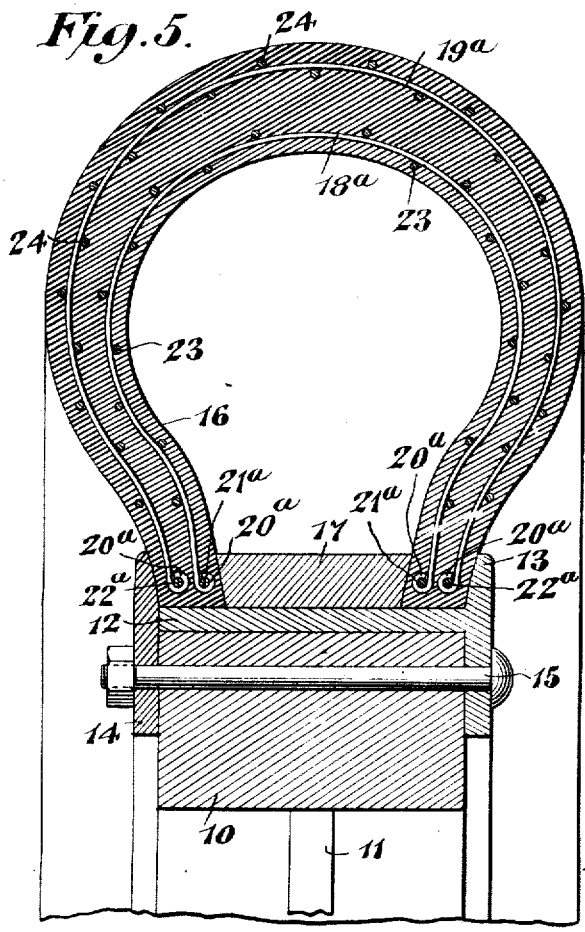
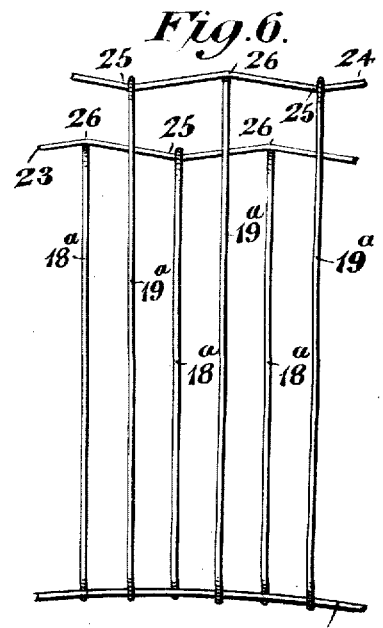
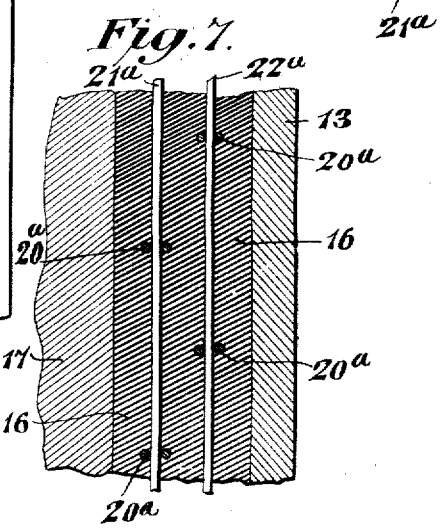
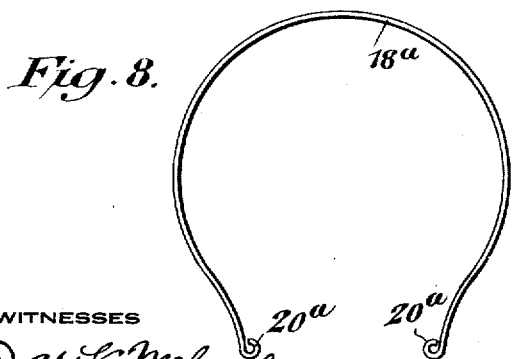
James A. Olinger, INVENTOR
WITNESSES
BY
ATTORNEY

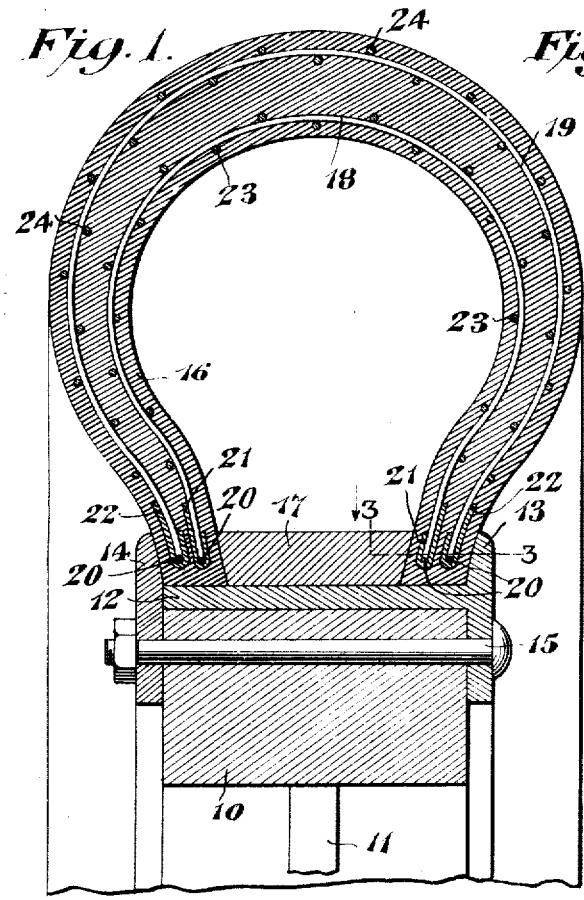
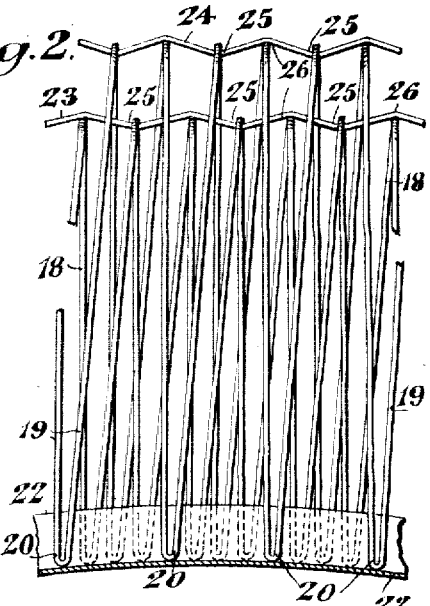
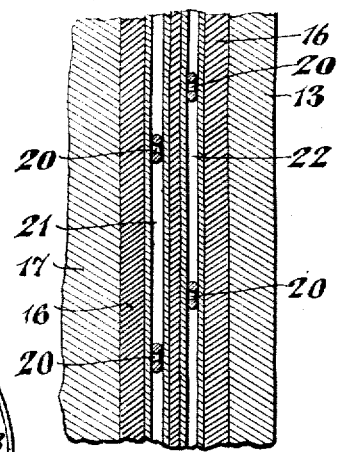
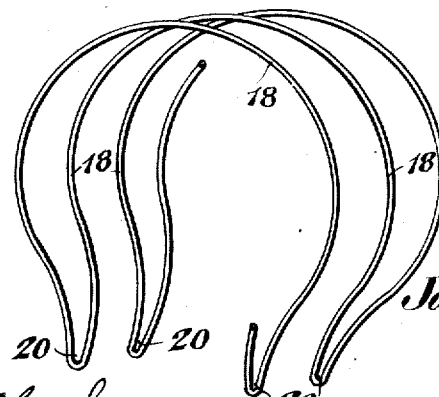

UNITED STATES PATENT OFFICE.

JAMES ALLISON OLINGER, OF BUTLER, PENNSYLVANIA.

RESILIENT TIRE.

1,242,846.      Specification of Letters Patent.      Patented Oct. 9, 1917.

Application filed October 10, 1916. Serial No. 124,820.

*To all whom it may concern:*

Be it known that I, JAMES A. OLINGER, a citizen of the United States, residing at Butler, in the county of Butler and State of Pennsylvania, have invented a new and useful Resilient Tire, of which the following is a specification.

The present invention relates to tires.

The object of the present invention is to provide a rubber or composition body, of the form of the usual pneumatic casing or shoe, with a resilient supporting frame embedded in the body for supporting the same in distended position with or without the use of an inner pneumatic tube or other means for forming an air cushion. The invention, however, also contemplates a reinforced body of this nature employing either wire or cord which may be used with an inner tube, if desired. The supporting frame, especially if of wire, then relieves the inner tube of most of the load when the weight placed upon the tire is sufficient to flex the latter.

In carrying out the invention, the frame is formed of a plurality of transversely extended loops embedded and spaced apart in the casing in the desired relation, and so connected that they are interbraced and held from displacement when the tire is submitted to pressure and is flexed.

The following is a disclosure of the present preferred embodiment of the invention, and it is to be understood that various changes and modifications may be made in the structure hereinafter described and illustrated in the accompanying drawings, within the scope of the appended claims, without departing from the spirit of this invention.

In the drawings:

Figure 1 is a transverse section of a tire constructed according to the present invention and as applied to the rim of a wheel.

Fig. 2 is a side elevation of the supporting frame shown in Fig. 1, with the channel strip in section.

Fig. 3 is a detail enlarged section, taken on the line 3—3 of Fig. 1, showing the inner edge of the frame at one side of the tire body.

Fig. 4 is a detail reduced perspective view of one of the members of the frame, showing the member made from a continuous length of wire.

Fig. 5 is a transverse section taken through a tire showing a slightly modified form of frame for supporting the tire body.

Fig. 6 is a detail side elevation of the supporting frame of Fig. 5.

Fig. 7 is a fragmentary sectional view of one edge of the supporting frame of Fig. 5.

Fig. 8 is a detail reduced view showing in elevation one of the transversely extending loops of which the frame of Fig. 5 is composed.

Referring to these drawings, wherein like parts are designated by similar numerals of reference throughout the several views, 10 designates the felly of a wheel mounted in any suitable manner upon the spokes 11, and provided with a rim 12. The rim has an integral flange 13 at one side and a detachable flange 14 at its opposite side, the rim being held to the felly 10 by a clamping bolt 15.

A tire body 16, of the usual form of a pneumatic tire, is mounted upon the rim 12 between the flanges 13 and 14, the edges of the body bearing against the flanges, and a spreading strip 17 may be placed between the edges of the body 16 of the tire to hold the edges against the flanges 13 and 14.

Instead of placing an inner tube or other air cushion within the body 16 to distend the latter, a resilient supporting frame is embedded in the tire body to hold it in proper shape and to support the load placed upon the tire, though the resilient frame may be employed with the inner tube.

In the Figs. 1 to 4 there is shown one form of the supporting frame. In this form the frame is composed of an inner part, and an outer concentric part. The inner part is made of a single length of wire which, as shown in Fig. 4, is bent to provide a plurality of substantially U-shaped loops 18, the adjacent ends of which are connected together by virtue of the integral formation of the part, and are embedded in the opposite edges of the tire body 16. The outer part of the supporting frame is also made of a single length of wire bent in the same manner as shown in Fig. 4 to provide a plurality of transversely extending loops 19, but which are larger than the loops 18, and which are arranged substantially concentric thereabout.

The bent or returned ends 20 of the loops 18 and 19 may be seated respectively in inner and outer channel strips 21 and 22. The channel strips are embedded in the tire body and prevent the returned ends 20 from cutting the tire body, and anchor the loops in their proper positions.

A plurality of spaced apart bracing rings 23 extend longitudinally throughout the tire body and engage the loops 18 of the inner part of the frame to interbrace the loops. A second set of bracing rings 24 are provided for engagement with the loops 19 of the outer part of the frame for interbracing the loops thereof. Each bracing ring, 23 and 24, is crimped at equi-distant points to provide alternate outwardly and inwardly bracing angles, 25 and 26, and is in the form of a ring extending in a zig-zag path outwardly across one of the loops and then inwardly across the next adjacent loop. One alternate set of the loops of each part are seated in the angles 25, while the other alternate set of the loops of each part are seated in the angles 26. The bracing rings hold the loops 18 and 19 from movement toward or from each other.

From Fig. 2 of the drawings it will be noted that the loops 18 are offset or staggered from the loops 19 so as to reinforce the tire body 16 at points between the large loops 19.

It will be noted upon reference to Figs. 1 and 5 that the bracing rings 23 and 24 are arranged in a series extending entirely around the loops from one side of the tire to the other. By reason of the fact that some of the rings engage the inner side of one loop and others engage the outer side of the same loop, the latter is engaged on opposite sides at spaced points by the series of rings. By this arrangement the loops are firmly held from movement in any direction, and it is this feature of the invention which distinguishes it from constructions known to me.

Another form of this invention is shown in Figs. 5 to 8, wherein the tire body 16 is of the same form as shown in Fig. 1, but the inner and outer parts of the reinforcing frame are each made up of a plurality of independent spaced apart loops 18ª and 19ª.

Each of these separate loops, 18ª and 19ª, is bent substantially U-shaped, and has its ends rolled over to provide eyes 20ª to receive therethrough anchoring rods or cords 21ª and 22ª respectively connecting the inner and outer series of loops. These wires or cords are used in place of the channel strips 21 and 22 of the form shown in Fig. 1.

The bracing rings 23 and 24 hold the loops 18ª and 19ª in properly spaced relation in the same manner as above described.

It is quite feasible to use cord in place of wire or the like and to employ the usual inner tube, in which case the cord or wire serves as a reinforcing strand.

The construction shown in Figs. 1 to 4 inclusive, wherein channel strips engage the bent or returned ends of the loops, is claimed in my application Serial No. 86,469, filed March 24, 1916.

What is claimed is:—

1. In combination with a tire body, a supporting frame embedded therein comprising a plurality of spaced apart transversely extending substantially U-shaped loops arranged in two separate series, one series being of greater diameter than the other, the smaller loops being arranged between the larger loops, and means for connecting the individual loops of each series to keep them spaced apart, said means being arranged longitudinally of the loops around the tire.

2. In combination with a tire body, a supporting frame embedded therein comprising a plurality of spaced apart transversely extending substantially U-shaped loops, arranged in two separate series, one series being of greater diameter than the other, the smaller loops being arranged alternately in the spaces between the larger loops, means for connecting the loops of each series at their ends where they connect with the rim of the wheel, said means extending around the tire, and separate means also extending around the tire for connecting the loops of each series at different points between the ends of the loops.

3. In combination with a tire body, a supporting frame embedded therein and comprising a plurality of spaced-apart, transversely extending loops, arranged in two separate series, one series being of greater diameter than the other, means for independently connecting the loops of each series at their ends where the tire body is connected with the rim of the wheel, said means extending around the tire, and separate means also extending around the tire for independently connecting the loops of each series at different points between the ends of the loops.

4. A supporting frame for tire bodies formed of a plurality of spaced apart, transversely extending, substantially U-shaped loops, and a plurality of circumferential bracing rings, said rings being arranged at right angles to the loops and crossing the same and spaced apart transversely of the tire and along the loops from one end of the loops to the other end, each ring being initially crimped at intervals in opposite directions so as to provide alternately arranged seats which engage alternately over and under each loop so that each loop has a plurality of rings engaging alternately both under and over the same from one side of the tire to the other.

5. A supporting frame for tire bodies comprising a series of large loops arranged transversely in the tire body and being spaced apart throughout the length of the same, a series of small loops arranged transversely in the body and being spaced apart and arranged between the other loops throughout the length of the body, both the large and small loops being substantially U-shaped, and a plurality of circumferential bracing rings crimped at interval in opposite directions so as to provide alternately arranged seats which engage alternately over and under each loop throughout the series, whereby each loop has a plurality of rings engaging both under and over the same from one side to the other.

6. A supporting frame for a tire body comprising a plurality of independent and separate substantially U-shaped loops arranged transversely in the body and having their free ends provided with eyes, wires passed around the tire and engaged through the eyes of the loops to hold the latter in place, and a plurality of circumferential bracing rings, each ring being initially crimped at intervals in opposite directions so as to provide alternately arranged seats which engage alternately over and under each loop throughout the series, said rings being spaced apart transversely of the tire, whereby each loop has a plurality of rings engaging alternately both under and over the same from one end of the loop to the other end.

7. A supporting frame for a tire body comprising inner and outer pairs of wires adapted to be embedded in the opposite edges of the tire body, a plurality of transversely extending loops embedded in the tire body, said loops being formed into a series of large loops, and into an independent series of small loops, said loops having their free ends overturned to provide eyes for engagement respectively with said inner and outer wires, and bracing rings threaded back and forth alternately over and through each row of loops to interbrace the same.

In testimony, that I claim the foregoing as my own, I have hereto affixed my signature in the presence of two witnesses.

JAMES ALLISON OLINGER.

Witnesses:
A. M. BEERS,
NELSON SMITH.